United States Patent Office 2,914,485
Patented Nov. 24, 1959

2,914,485
METHOD OF PREPARING PLATINUM-ALUMINA CATALYST

Carl D. Keith, Munster, Ind., assignor to Engelhard Industries, Inc., a corporation of New Jersey No Drawing. Application May 31, 1957
Serial No. 662,594

4 Claims. (Cl. 252—441)

This invention relates to the production of catalysts and, more particularly, to a novel method of producing a platinum-alumina catalyst of improved reforming activity.

It has been proposed to reform naphtha fractions of gasoline boiling range to obtain a liquid product of enhanced octane number. In one method the hydrocarbon is contacted in the presence of a free hydrogen-containing gas with an alumina based catalyst containing platinum and in the process the conditions are such that there is a net production of hydrogen. During the reforming operation reactions such as dehydrogenation, isomerization, dehydrocyclization and hydrocracking are effected. The platinum-alumina catalyst in the system contains a relatively small amount of platinum and the performance of the catalyst is sensitive to variations in its composition and to its method of preparation. Due to the high cost of platinum it is desirable to obtain catalysts of improved properties as a means of decreasing costs in the commercial processing units employing thousands of pounds of catalyst.

Various methods of preparing these platinum-alumina catalysts have been suggested, the two predominant ones being the "in-situ" method wherein an alumina hydrate slurry is mixed with a source of platinum such as chloroplatinic acid and thereafter precipitation of the platinum from the solution is afforded by the addition of hydrogen sulfide; and the "sol" method wherein a platinum sulfide sol is formed by adding hydrogen sulfide to chloroplatinic acid and thereafter mixing the sol with a slurry of alumina hydrate. In both of the above methods, the platinum sulfide-containing alumina hydrate is dried and calcined in order to drive-off the free water and water of hydration, leaving a catalyst composed of activated or gamma alumina containing a minor amount of platinum.

The alumina material employed in making the base or support for catalysts of this type has been, principally, of two kinds; the first being an alumina hydrate phase which predominates in the trihydrate form and the second which is termed a boehmite-type alumina wherein the alumina is predominantly in the monohydrate form.

I have found that one of the material considerations in the manufacture of satisfactory platinum-alumina catalysts is the method by which the platinum is deposited on the alumina. When the catalyst support is made from alumina hydrate predominating in the trihydrate form, that is, when the boehmite concentration is low, the in-situ precipitation of platinum sulfide with hydrogen sulfide or the platinum sulfide sol method with no prior aging of the sol produces a satisfactory catalyst. However, in this invention I have found that when the catalyst is made from alumina hydrate predominating in boehmite, the "sol" method of deposition can be used with advantage providing there is close control of the colloidal size of the platinum sulfide particles prior to the deposition of the platinum on the boehmite hydrate phase. This procedure will yield a catalyst having superior reforming activity than those catalysts produced by the in-situ precipitation procedure or the sol method wherein no control of the platinum sulfide particle size is effected.

In accordance with my invention, I control the colloidal size of the platinum sulfide sol particles by allowing them to agglomerate or age in the aqueous medium for a short period of time prior to mixing the sol with the aqueous alumina hydrate slurry. Generally, this time should be sufficient to afford particles of the sol of a size large enough to give discrete platinum particles on the alumina base but yet not so large that a predominant portion of the platinum is not dispersible to the finely divided form desired for combination with the alumina hydrate.

The method of preparation of my improved catalyst can best be shown by reference to the following specific examples which are not to be considered as limiting the scope of the invention. Example I shows a method of preparing the alumina monohydrate catalyst base precursor and the subsequent examples illustrate the preparation of my catalyst using a hydrate prepared substantially as described in Example I.

EXAMPLE I

The alumina base precursor consists of a mixture of two hydrogels designated (A) and (B) in proportions of 1/3 of (A) to 2/3 of (B). The two hydrogels were prepared as follows:

(A) To a vigorously stirred solution of 25.48 pounds of $AlCl_3/6H_2O$ in 51 liters of deionized water was added a $NH_4OH$ solution composed of equal volumes of water and of .90 specific gravity $NH_4OH$. A total of 19.7 liters of 1:1 $NH_4OH$ solution brought the pH to 8.2. Thirty-five minutes elapsed time was used for the addition. The addition of the $NH_4OH$ was discontinued briefly at pH 5 to allow the viscous slurry to become more fluid.

After additional stirring the precipitate was separated in a plate and frame press. However, the filter cake was "not too solid" which dictated reslurrying and refiltering whereupon a more firm cake resulted. The latter was divided into 1-inch cubes, placed in a vessel of deionized water and washed by percolation, i.e. running deionized water past the cake at 20 liters/hour. Washing was continued approximately 830 hours.

(B) A second batch of material was prepared by the same procedural steps as employed above. 25 pounds of $AlCl_3/6H_2O$ was dissolved in deionized water and reacted with 19.7 to 20.0 liters of 1:1 $NH_4OH/H_2O$, i.e. to a pH of 8.2 to 8.3. Percolation washing of the broken filter cakes was conducted for 688 hours at 60 gallons of water/hour and for 18.9 hours at 30 gallons of water/hour.

Thereafter 41.59 pounds of preparation (A) and 105.68 pounds of preparation (B) and 111.45 pounds of deionized water were stirred together to form the alumina hydrate slurry. X-ray diffraction patterns of the hydrate, after drying at 110° C., indicated small crystallite boehmite plus a small amount of gibbsite (trihydrate).

A series of platinum catalysts were prepared using the alumina hydrate of Example I as the catalyst base precursor. Briefly, the four sample catalysts were prepared as follows: Example II was prepared by the "in-situ" platinum addition. Example III was prepared by allowing a platinum sulfide sol to age one minute prior to admixing with the alumina hydrate. Example IV was prepared by allowing a platinum sulfide sol to age 15 minutes prior to mixing with the alumina hydrate and in Example V a platinum sulfide sol was allowed to age 45 minutes prior to mixing with the alumina hydrate. Specific examples of the four platinum-alumina catalysts follow:

EXAMPLE II 12,750 grams of the hydrate slurry of Example I (equal to 521 grams of $Al_2O_3$ on dry basis) were mixed with 4 liters of deionized water and vigorously stirred for 30 minutes in an 8 gallon stoneware jar fitted with an air driven stirrer. 7.68 grams of $NH_4F$ (equal to 3.94 grams of fluoride) was dissolved in 300 ml. of deionized water and slowly added to the alumina hydrate slurry with continuous stirring. After a few mls. of the $NH_4F$ solution had been added, the slurry thickened. Addition of the $NH_4F$ solution was discontinued until the slurry became more fluid. The remainder of the $NH_4F$ was added over a 10 to 15-minute period and the mixture stirred for an additional 30 minutes. 42.8 ml. of $H_2PtCl_6$ solution (equivalent to 1.84 grams of platinum) was diluted with 260 ml. of deionized water and the diluted $H_2PtCl_6$ solution was slowly added to the alumina slurry with vigorous stirring. The stirring was continued for 10 minutes. 427 ml. of deionized water was saturated with $H_2S$ at 78° F. and the resulting $H_2S$—$H_2O$ solution was slowly added to the chloroplatinic acid-alumina hydrate slurry. The mixture was vigorously stirred for an additional 30 minutes. The final platinum-alumina slurry had a tan colored appearance. The platinum-alumina slurry was poured into 4 Pyrex trays and allowed to dry overnight in an Aminco oven at 110° C. The catalyst was mixed frequently during this drying stage. The dried catalyst was ground to pass 20 mesh and 2% of sterotex was added and thoroughly mixed after which the catalyst was tabletted as $\frac{5}{32}$" tablets. The resulting catalyst tablets were calcined by heating to about 1090° F. with 300 mls./hour of $N_2$ and 5 liters/hour of air flowing through the calciner. The mixture of $N_2$ and air was fed through the calciner for 2½ hours. The $N_2$ feed was cut out and the catalyst was further calcined for 3 hours at 1100° F. in 300 liters/hour of flowing air.

EXAMPLE III 4270 grams of the alumina hydrate obtained in Example I (equal to 174 grams of $Al_2O_3$ on dry basis) was dispersed in 1350 ml. of deionized water by vigorous stirring for 30 minutes. 2.55 grams of $NH_4F$ (equal to 1.31 grams of fluoride) was dissolved in 100 ml. of deionized water and added over a 5 to 10-minute period to the alumina hydrate slurry. Stirring was continued for 30 minutes. 142 mls. of deionized water was saturated with $H_2S$ at 78° F. 14.25 ml. of $H_2PtCl_6$ (equal to .613 grams of platinum) was diluted with 64 ml. of deionized water. The 142 mls. of $H_2S$—$H_2O$ solution was added to the $H_2PtCl_6$ solution and allowed to remain in a quiescent state for one minute. After aging for one minute, the platinum sulfide sol was added to the alumina slurry over a one-minute period and the stirring continued for 30 minutes.

The subsequent drying, tabletting, and calcining were carried out substantially as described in Example II.

EXAMPLE IV

This catalyst was prepared in substantially the same manner as described in Example III with the exception that the platinum sulfide sol was allowed to age for about 15 minutes.

EXAMPLE V

This catalyst was also prepared substantially as described in Example III with the exception that the platinum sulfide sol was allowed to age for about 45 minutes.

The catalysts of Examples II, III, IV and V were utilized in a reforming operation in order to compare their relative activities. The feed stock for these reactions was a straight run petroleum naphtha having the following characteristics:

Av. mol. weight _____ 1.30
R.M.O. No. (neat) _____ 37.3
Reid vapor pressure _____ 0.9
ASTM Dist.:
  Initial boiling point _____° F__ 252
  50% boiling point _____° F__ 306
  End point _____° F__ 390

The pressure on the system was maintained at about 720 p.s.i.g., the liquid hourly space velocity (LHSV) was 4 and the recycle hydrogen-containing gas to feed molar ratio was 4:1. The processing temperature was held at about 870° F. for the first run and at about 890° F. for the second run with each catalyst.

Table I shows the pertinent data as regards the relative activity of each of the catalysts.

*Table I*

|  | Ex. II | Ex. III | Ex. IV | Ex. V |
|---|---|---|---|---|
| Pt Sol Aging Time | In-situ | 1 min. | 15 min. | 45 min. |
| Percent Pt | 0.35 | 0.37 | 0.35 | 0.38 |
| Percent F | 0.75 | 0.76 | 0.68 | 0.68 |
| A.D. (gm./cc.) | 0.85 | 0.84 | 0.88 | 0.89 |
| Activity at 870° F. Wt. Percent Stabilized Reformate | 89.9 | 87.0 | 90.1 | 92.2 |
| R.M.O. No. of Stabilized Reformate | 73.8 | 76.2 | 79.9 | 81.0 |
| Activity at 890° F. Wt. Percent Stabilized Reformate | 91.2 | 88.5 | 84.7 | 82.8 |
| R.M.O. No. of Stabilized Reformate | 79.8 | 80.0 | 82.8 | 85.1 |

Thus, the catalysts produced in accordance with my invention show a much higher activity than the catalysts produced by either the in-situ method of platinum precipitation or by the sol method wherein the platinum sulfide sol is not allowed to age for an appreciable extent of time as evidenced by the rise in the octane number of the stabilized reformate obtained with the catalyst of Examples IV and V.

A series of similar tests were run on platinum-alumina catalysts wherein the alumina base precursor was comprised essentially of the trihydrate form, i.e. about 80–86%, the remainder being monohydrate or amorphous hydrous alumina. The results of these tests are set forth in Table II. The feed stock was essentially the same as that described above. The liquid hourly space velocity (LHSV) was 4.4 and the recycle hydrogen-containing gas to feed molar ratio was 5:1. Other conditions are as described in the table.

*Table II*

|  | Catalyst | | | | | |
|---|---|---|---|---|---|---|
|  | 1 | 2 | 3 | 4 | 5 | 6 |
|  | 0.35% Pt, "in-situ" | 0.35% Pt, 15 min. sol. | 0.6% Pt, "in-situ" | 0.6% Pt, 1 min. sol. | 0.6% Pt, 15 min. sol. | 0.6% Pt, 60 min. sol. |
| Activity at 500 p.s.i.g.: | | | | | | |
| 890° F. Test— | | | | | | |
| Wt. Percent Stabilized Reformate | 85.2 | 85.6 | 83.5 | 86.1 | 87.3 | 84.9 |
| R.M.O. No. of Stabilized Reformate | 79.0 | 80.0 | 80.3 | 78.0 | 77.8 | 82.4 |
| 925° F. Test— | | | | | | |
| Wt. Percent Stabilized Reformate | 75.3 | 79.9 | 78.5 | 78.4 | 80.4 | 77.2 |
| R.M.O. No. of Stabilized Reformate | 90.7 | 90.9 | 90.2 | 92.0 | 90.0 | 91.7 |
| Activity at 200 p.s.i.g.: | | | | | | |
| 890° F. Test— | | | | | | |
| Wt. Percent Stabilized Reformate | 85.8 | 85.7 | | | | |
| R.M.O. No. of Stabilized Reformate | 86.0 | 87.6 | | | | |
| 925° F. Test— | | | | | | |
| Wt. Percent Stabilized Reformate | 78.1 | 78.7 | | | | |
| R.M.O. No. of Stabilized Reformate | 95.8 | 95.1 | | | | |

An examination of Table II reveals that the sol aging treatment in accordance with my invention does not result in the increase in the activity of the catalyst when the alumina hydrate is composed predominantly of alumina in the trihydrate form as when it is primarily the monohydrate boehmite.

Thus, my improved catalysts are provided by mixing an aqueous platinum sulfide sol which has been allowed to age for a short period of time with a slurry of alumina hydrate which is predominantly in the monohydrate form. The platinum sulfide sol can be prepared by reacting in an aqueous medium a halogen platinic acid with hydrogen sulfide and allowing the platinum particles in the resultant platinum sulfide sol to set or age for a limited period of time, generally for at least about 15 minutes and no longer than about 2 hours, preferably about 45 minutes. If the platinum sulfide sol is not allowed to flocculate for this minimum period of time, the platinum-containing particles will not be large enough to gain the full advantages of my invention and if this flocculation is allowed to proceed substantially beyond the two-hour period, the particles can become unduly large, thus decreasing their ability to be dispersed throughout the alumina hydrate slurry. It is to be noted, however, that the above suggested aging periods are not to be considered as strictly limiting but rather, the aging period is dictated by the size of the platinum-containing particle found most advantageous under any given set of processing conditions.

The hydrogen sulfide can be employed as a gas or in an aqueous medium. The platinum usually comprises a minor amount between about .1 to 2% or more by weight of the final catalyst and may be added by the use of any of the halogen platinic acids such as the chloro-, bromo-, or iodo-platinic acids. The alumina hydrate catalyst base precursor is advantageously comprised essentially of about 70 to 100% of alumina monohydrate, i.e. boehmite, the remainder being alumina trihydrate or amorphous hydrous alumina. The separate types of hydrous alumina are identified by X-ray diffraction techniques on samples dried at 110° to 120° C. The alumina hydrate can be prepared, for instance, by reacting a strong acid aluminum salt with a base such as ammonium hydroxide. In this system, the initial alumina hydrate obtained is reslurried and rewashed with water to remove the chloride ions. Sodium aluminate and other materials containing aluminum can also be employed as a hydrate source if desired.

After addition of the platinum component to the catalyst base precursor the impregnated hydrate is dried and calcined. Drying removes the free water while the calcination removes water of crystallization. In general, the calcination is conducted to obtain activated alumina at temperatures ranging from about 800 to 1300° F. or more while in a flowing gas stream such as air, nitrogen, hydrogen, etc. or a mixture of these gases. In the above examples, I have shown the catalyst being formed in tablets prior to calcination; however, this is optional and the catalyst may be extruded or used in finely divided form if desired. Before use, the catalyst is generally reduced by contacting with a free hydrogen-containing gas at elevated temperatures, for example, about 500° to 1000° F. This hydrogen contact can advantageously be performed within the reforming system.

In reforming of gasoline boiling range hydrocarbons my catalyst can be employed under the usual processing conditions, for instance 800 to 1000° F., 100 to 750 p.s.i., 1 to 10 LHSV and 2 to 20 moles of hydrogen per mole of hydrocarbon. The hydrogen can be supplied to the reaction zone by recycling hydrogen-rich tail gases. The catalyst can be employed in a fixed, moving bed or a fluidized system. Most often the system is comprised of a plurality of adiabatic reactors with a fixed bed in each reactor and a feed heater before each reactor. The liquid product can be separated from the reaction effluent as in an atmospheric pressure flash drum.

In Examples II to V, I have shown the catalyst having incorporated therein a small amount of fluoride promoter through the addition of $NH_4F$. However, it is to be understood that the fluoride may be incorporated by the use of other compounds such as HF or omitted entirely from the catalyst if desired. The amount of fluoride may vary considerably; however it is preferred that the fluoride be within about 0.1% to 3.0% by weight of the finished catalyst.

I claim:

1. In a method for producing a platinum-alumina catalyst, the steps comprising forming an aqueous alumina hydrate slurry in which the hydrate is composed predominantly of alumina monohydrate, forming a platinum sulfide sol by reacting a halogen platinic acid with hydrogen sulfide, allowing the resultant platinum sulfide sol to age and agglomerate for about 15 minutes to about 2 hours, incorporating said aged platinum sulfide sol in said alumina hydrate slurry in such proportions that the platinum comprises about 0.1 to 2.0% by weight of the final catalyst, and drying and calcining the resulting platinum-containing alumina hydrate to obtain the catalyst.

2. The method of claim 1 wherein the alumina hydrate contains a small amount of a fluoride promoter.

3. The method of claim 2 wherein the platinum sulfide sol is allowed to age about 45 minutes.

4. The method of claim 1 wherein the platinum sulfide sol is allowed to age about 45 minutes.

References Cited in the file of this patent

UNITED STATES PATENTS

| | | |
|---|---|---|
| 2,479,109 | Haensel | Aug. 16, 1949 |
| 2,659,701 | Heard | Nov. 17, 1953 |
| 2,667,461 | Guyer | Jan. 26, 1954 |